United States Patent [19]
Noh

[11] Patent Number: 5,917,952
[45] Date of Patent: *Jun. 29, 1999

[54] COMPRESSION OF RANDOMLY DITHERED BI-LEVEL IMAGES

[75] Inventor: Jae Noh, San Diego, Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/530,854

[22] Filed: Sep. 20, 1995

[51] Int. Cl.$^6$ ................. G06K 9/36; G06K 9/46
[52] U.S. Cl. .............. 382/239; 358/429; 358/457
[58] Field of Search ................ 382/232, 237, 382/239, 244; 358/429, 457; 341/56, 97, 131

[56] References Cited

U.S. PATENT DOCUMENTS

| 3,562,420 | 2/1971 | Thompson | 348/405 |
| 5,243,446 | 9/1993 | Pollich et al. | 358/429 |
| 5,430,555 | 7/1995 | Sawada et al. | 358/429 |
| 5,463,703 | 10/1995 | Lin | 358/261.1 |
| 5,506,624 | 4/1996 | Moreton | 348/420 |

*Primary Examiner*—Amelia Au
*Assistant Examiner*—Timothy M. Johnson
*Attorney, Agent, or Firm*—Jerry R. Potts

[57] ABSTRACT

A bi-level dithered image is compressed using knowledge of the particular dither matrix used to generate the dithered image from an original high resolution grey-scale image. A lower resolution grey-scale image is substituted for the original high resolution grey-scale image (which may be further compressed with known compression techniques), such that after the two images (after any required decompression) have been dithered by that same dither matrix, the resultant dithered images are the same (lossless compression) or substantially the same (lossy compression). In a preferred embodiment, the lower resolution encoded multi-tone image is based on variable sized blocks of pixels, with the dither matrix being used to determine an optimal size and intensity of each block in the encoded image such that when the lower resolution image is dithered, it is indistinguishable from the dithered original image. Since the encoded image is in effect merely a lower resolution version of the original image with the "blue" noise introduced by the dithering process removed, it can be further compressed by a conventional compression algorithm (such as the "JPEG" algorithm for lossy compression of continuous tone images or the "Ziv/Lempel" algorithm for lossless compression of digital data).

15 Claims, 5 Drawing Sheets

|   |   |   |   |
|---|---|---|---|
| 8 | 8 | 8 | 8 |
| 8 | 8 | 8 | 8 |
| 8 | 8 | 8 | 8 |
| 8 | 8 | 8 | 8 |

Fig. 2

| 1 | 10 | 16 | 8 |
|---|----|----|---|
| 11 | 3 | 5 | 14 |
| 15 | 7 | 2 | 9 |
| 6 | 13 | 12 | 4 |

Fig. 3

| 16 | 0 | 0 | 16 |
|----|---|---|----|
| 0 | 16 | 16 | 0 |
| 0 | 16 | 16 | 0 |
| 16 | 0 | 0 | 16 |

Fig. 4

| 16 | 16 | 0 | 0 |
|----|----|---|---|
| 0 | 16 | 16 | 0 |
| 0 | 0 | 16 | 16 |
| 16 | 0 | 0 | 16 |

Fig. 5

| 1 | 2 | 3 | 4 | 61 | 62 | 63 | 64 |
|---|---|---|---|---|---|---|---|
| 8 | 7 | 6 | 5 | 60 | 59 | 58 | 57 |
| 9 | 10 | 11 | 12 | 53 | 54 | 55 | 56 |
| 16 | 15 | 14 | 13 | 52 | 51 | 50 | 49 |
| 17 | 24 | 25 | 32 | 33 | 40 | 41 | 48 |
| 18 | 23 | 26 | 31 | 34 | 39 | 42 | 47 |
| 19 | 22 | 27 | 30 | 35 | 38 | 43 | 46 |
| 20 | 21 | 28 | 29 | 36 | 37 | 44 | 45 |

Fig. 9

COMPRESSION OF RANDOMLY DITHERED BI-LEVEL IMAGES

TECHNICAL FIELD

The present invention relates generally to the display and printing of dithered halftone images, and more particularly to a method of compressing such images to make more efficient use of storage and transmission capacity.

BACKGROUND ART

Digital technology is used to transmit, store, display, and print continuous tone ("grey-scale") images. To that end, the image to be printed is typically represented as a sequence of digits, each representing the density of a corresponding elemental portion of the image (a "picture element" or "pixel").

Considerable economies in the resources used to store and transmit image data can be achieved by "compressing" the image data. Known prior art image compression schemes include "JBIG" for bilevel images (eg, line drawings), and "JPEG" for continuous tone images (eg, photographs). Normally, image compression is "lossy" and will result in some degradation of image quality; however, even a lossy compression algorithm can be made "lossless" by comparing the degraded image after compression with the original image prior to compression to generate error data representing some or all of the data lost during compression. The error data can be compressed using a conventional lossless data-oriented compression scheme such as run-length encoding and appended to the compressed data representing the degraded image. For ephemeral display applications, it is usually sufficient to use a lossy compression scheme to transmit the image during a "browse" mode, and to use error data to reconstruct a more accurate version of the original image only when it is to be printed or otherwise archived.

JBIG, JPEG, and other prior art compression schemes for digital images are described in detail in Chapter 6 of "Managing Gigabytes" by Ian H. Witten et al (Van Nostrand Reinhold, N.Y., 1994), as well as in commonly assigned U.S. Pat. No. 5,245,679 and the various references discussed therein, which are hereby incorporated in their entirety by reference.

Since most conventional digital printing technologies (such as thermal ink-jet) and many digital display technologies (such as plasma) are restricted to rendering a given portion of the printed image as bilevel images in which any given area is either black (eg, covered with ink) or white (eg, free of ink), it is conventional to render intermediate grey-scale levels as "half-tone screens" having varying proportions of black and white areas. In order to avoid visible artifacts resulting from regular geometric relationships of the black and white areas with regular geometric elements in the original image, it is also conventional to randomize the size, shape and/or location of the individual areas.

Particularly when the resolution of the image forming process (eg, the size of the smallest solid area that can be covered with ink) is of the same order of magnitude as the resolution of the digitization of the image (size of an individual pixel), a dither matrix having different predetermined thresholds in each of its cells may be used to replace each input pixel in the original grey-scale image with a corresponding black or white output pixel, such that if the grey level of an input pixel is less or more than the threshold in the corresponding cell of the dither matrix, it is replaced in the printed image by a white or black pixel, respectively. Thus, different distributions of pixels will be generated for portions of the image having different levels of intensity.

However, because best results are obtained when the dithering process introduces "blue noise" into the image, for example by using a large dither matrix having a somewhat randomized distribution of thresholds, and because "pure" noise is inherently incompressible, the known bilevel image compression algorithms such as JBIG and conventional data compression algorithms such as LZW and Arithmetic Encoding will provide at best only a slight additional compression of continuous tone image data that has previously been processed into a bilevel image by an optimally randomized dither matrix. Conversely, use of the known continuous tone image data compression algorithms such as JPEG to compress the image data before it is dithered is believed to be inherently inefficient, because in most cases the undithered image will contain more information that the dithered image.

"Dithering with Blue Noise" and other halftone representations of a grey-scale image are described in detail in Chapter 8 of "Digital Halftoning" by Robert Ulichney (The MIT Press, Cambridge Mass., 1987) and the various references discussed therein, which are hereby incorporated in their entirety by reference.

DISCLOSURE OF INVENTION

The invention is an improved method of compressing a bi-level dithered image which in effect uses knowledge of the particular dither matrix used to generate a dithered image from the original high resolution grey-scale image to substitute a lower resolution grey-scale image for the original high resolution grey-scale image (which may be further compressed with known compression techniques), such that after the two images (after any required decompression) have been dithered by that same dither matrix, the resultant dithered images are the same (lossless compression) or substantially the same (lossy compression).

In its broadest aspect, the invention consists of storing or transmitting a lower resolution undithered multi-level image rather than a dithered bi-level image, with the dither matrix being used before storage or transmission as an encoding key (or template) which is used to produce the lower resolution image, and also being used a second time after storage or transmission to derive the dithered bi-level image from the lower resolution multi-tone image. In one embodiment, the lower resolution encoded multi-tone image is based on fixed size blocks of several pixels, with the dither matrix being used to determine an optimal intensity of each block in the encoded image such that when the lower resolution image is dithered, it best approximates the dithered original image. In a presently preferred second embodiment, the dither matrix is used to determine not only the intensity of each block, but also its size. In either case, since the encoded image is in effect merely a lower resolution version of the original image with the "blue" noise introduced by the dithering process removed, it can be further compressed by a conventional compression algorithm (such as the "JPEG" algorithm for lossy compression of continuous tone images or the "Ziv/Lempel" algorithm for lossless compression of digital data). In a third embodiment, rather than use a single intensity for an entire block, the intensity for each block is given by a polynomial or other waveform, such as a Fourier series or a straight slope, with the coefficients defining the waveform being further compressible by standard data compression techniques (such as the adaptive compression proposed by Ziv and Lempel).

BRIEF DESCRIPTION OF DRAWINGS

FIG. 2 shows a single 4×4 block of a grey scale image.

FIG. 3 shows a corresponding 4×4 dither matrix.

FIG. 4 shows a bilevel image obtained by applying the dither matrix of FIG. 3 to a solid expanse halfway between white and black.

FIG. 5 depicts a bi-level image which is unaffected by the dither matrix of FIG. 3.

FIG. 9 shows a linear path extending through adjacent areas.

PREFERRED MODE FOR PRACTICING THE INVENTION

Figure 1:
FIG. 1 shows a photographic image that has been digitized and processed by a 64×64 dither matrix.

Although in the interest of clarity the following description assumes a relatively coarse digitization of intensity (4 bits) and a relatively small dither matrix (4×4), it should be understood that low resolution images dithered by a small dither matrix do not have a particularly high noise content and are readily compressed by conventional means, and that the advantages of the present invention are particularly apparent when used in connection with the type of image exemplified by FIG. 1, namely a photographic image having a wide range of intensity values (eg, 8 bits) that has been digitized and processed by using a relatively large dither matrix (eg, 64×64) whose individual entries correspond to thresholds for the individual pixels which are distributed in a pseudo-random pattern containing a certain amount of high frequency noise. In any event, it should be obvious to those skilled in the art that the compression methodology of the present invention that will now be described in detail may be readily extended all types of dithered digitized images, regardless of the number of pixels in the original image or the number of cells in the dither matrix, and regardless of the number of possible intensity levels for each pixel in the original image or the number of possible thresholds in each cell of the dither matrix.

FIG. 2 represents a single 4×4 block of a grey scale image, with each of the 16 pixels being represented by a number from 0 (pure white) to 16 (pure black). In the particular block illustrated, all pixels have the same value (8) which corresponds to a level of grey halfway between black and white.

FIG. 3 shows one possible example of a corresponding 4×4 dither matrix. Each cell of the matrix represents a randomized 4-bit threshold from 1 to 16 used to replace a respective pixel in the original grey-scale image with either a "black" pixel (if the value of the original pixel is greater than or equal to the threshold) or a "white" (if the value of the original pixel is less than the threshold). Thus, since the intensity of the top left pixel of the original grey-scale image is 8 and the associated threshold of the dither matrix is a 1, it is replaced by a black pixel in the dithered image (FIG. 4). Similarly, the second pixel in the first row also has an intensity of 8, but since the associated threshold of the dither matrix is a 10, it is replaced by a white pixel. This illustrates a significant property of using a dither matrix to process an image, namely that whether a given grey-scale pixel is replaced by a black pixel or a white pixel is dependent not only on the intensity of the original pixel but also on its location. Thus, as shown in FIG. 4, a portion of an image that is halfway between white and black (intensity=8) will be converted to a dithered bi-level image (ie, a somewhat random pattern of black pixels) that cover approximately half of the available surface.

Those skilled in the art will realize that application of the same dither matrix (FIG. 3) to other multi-pixel blocks of the image (FIG. 1) will cause a darker block of the image to be represented by more black pixels and fewer white pixels, and a lighter block to be represented by fewer black pixels and more white pixels, with the representation being more precise for those portions of the image which are solid black or solid white, and more random for those portions which include intermediate levels of grey. FIG. 5 depicts a second grey-scale image that has an average value of 7, but which includes eight white pixels of intensity 0 and eight black pixels of intensity 16. When processed by the same dither matrix, the result is a pattern corresponding exactly to the original undithered image, thereby illustrating another fundamental property of processing an image with a dither matrix, namely that the dithering affects only the grey areas of the image, not the white or black areas, and thus degraded image resolution of the dithered image is most apparent in the low contrast areas of the original image; for example, the bi-level block of FIG. 5 whose 16 pixels are either 0 (white) or 16 (black) is unaffected by the dither matrix of FIG. 3.

Figure 6:
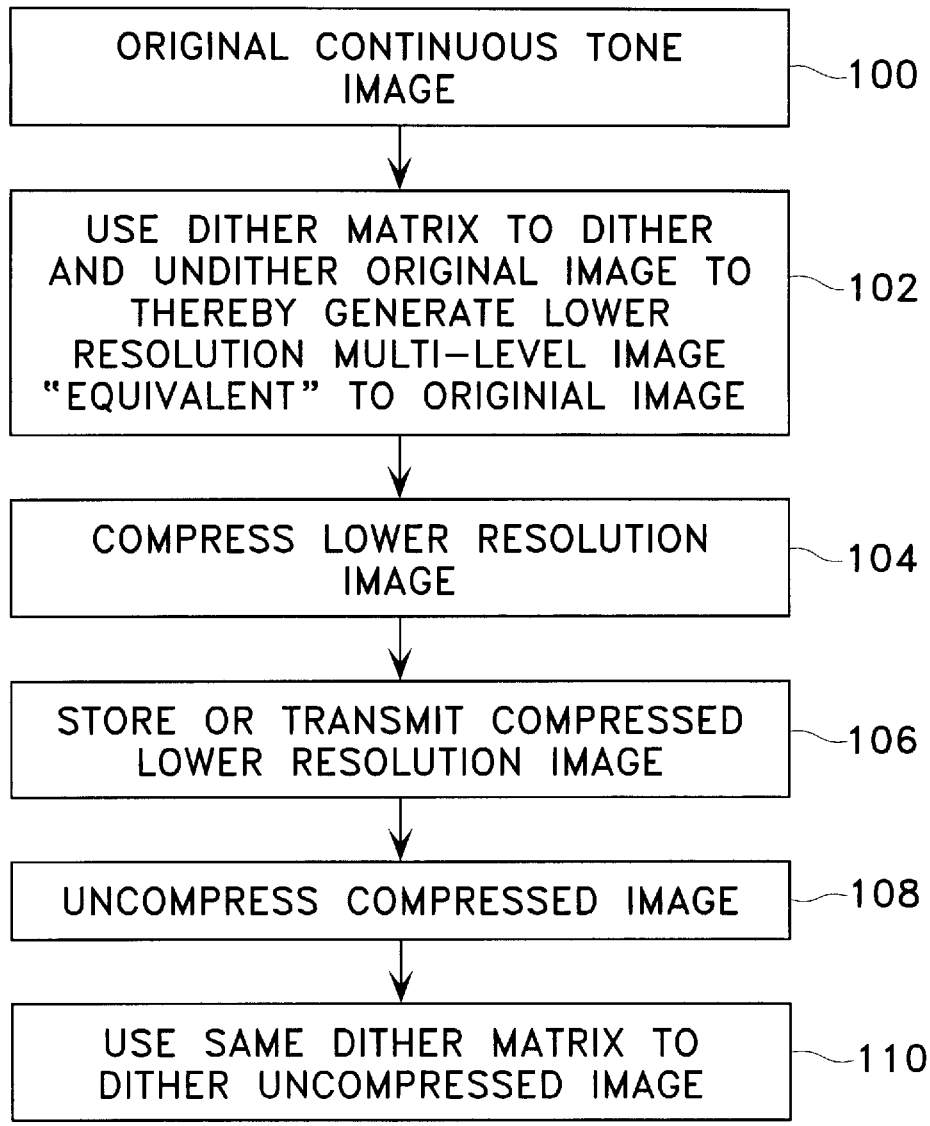
FIG. 6 shows the overall process of the present invention.

As shown in the flow chart of FIG. 6, rather than compressing an already dithered image, the present invention uses a preexisting dither matrix to to generate a lower resolution multi-level image (block 102) from the original image (block 100) preferably by first applying a dithering transformation which converts the original image to a lower resolution image having fewer shades of grey to which a certain amount of "blue noise" has been added and then applying an undithering transformation to derive an "equivalent" lower resolution image from which any such blue noise has been removed, and stores or transmits data representing that equivalent lower resolution image (block 106), which is subsequently processed in accordance with that same dither matrix to produce the same (or a substantially similar) dithered image as would have resulted had that same dither matrix been used to dither the original image (block 110). Since the undithered lower resolution image is a lower resolution multi-level image free of any blue noise introduced by the dithering process, it may be further compressed (block 104) and uncompressed (block 108) by other conventional means.

In a particularly simple embodiment of the process of FIG. 6, each block of 4 small pixels of the grey scale image of FIG. 1 (which occupies 414 kilobytes without any dithering or compression) was replaced by a single larger pixel, with the intensity of each block being set at a value that when processed by conventional dither matrix (for example a 64×64 bit dither matrix), best approximates the dithered version of the corresponding block of the original image. This resulted in a compression factor of 4:1, which was further compressed by a factor of 14:1 by means of the conventional JPEG algorithm (with Q=100), resulting in a net compression of 55:1. Thus, by reducing the image resolution by a factor of 4 before using JPEG, the required memory is only 7.5 kilobytes, compared to the 24 kilobytes that would be required for JPEG compression (also with Q=100) of the full resolution of the original image. However, although the overall appearance of the 7.5 kilobyte image after dithering is almost as good as the 414 kilobyte original dithered image with lossless compression, there is a noticeable loss in resolution especially in the high contrast portions of the image. Moreover, since JPEG is a "lossy" compression scheme, both the full resolution image and the reduced resolution demonstrate some visible loss of image quality after compression with JPEG which is still apparent in the final dithered image, particularly in high contrast geometric images such as printed text and grids.

Figure 7:
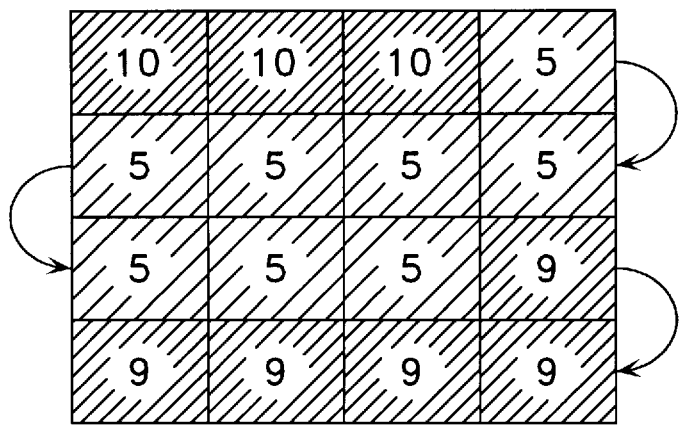
FIG. 7 shows how a 2-dimensional dithered image such as shown in FIG. 5 may be represented as a sequence of different sized blocks oriented along a linear path and each associated with a single shade of grey.
Figure 8:
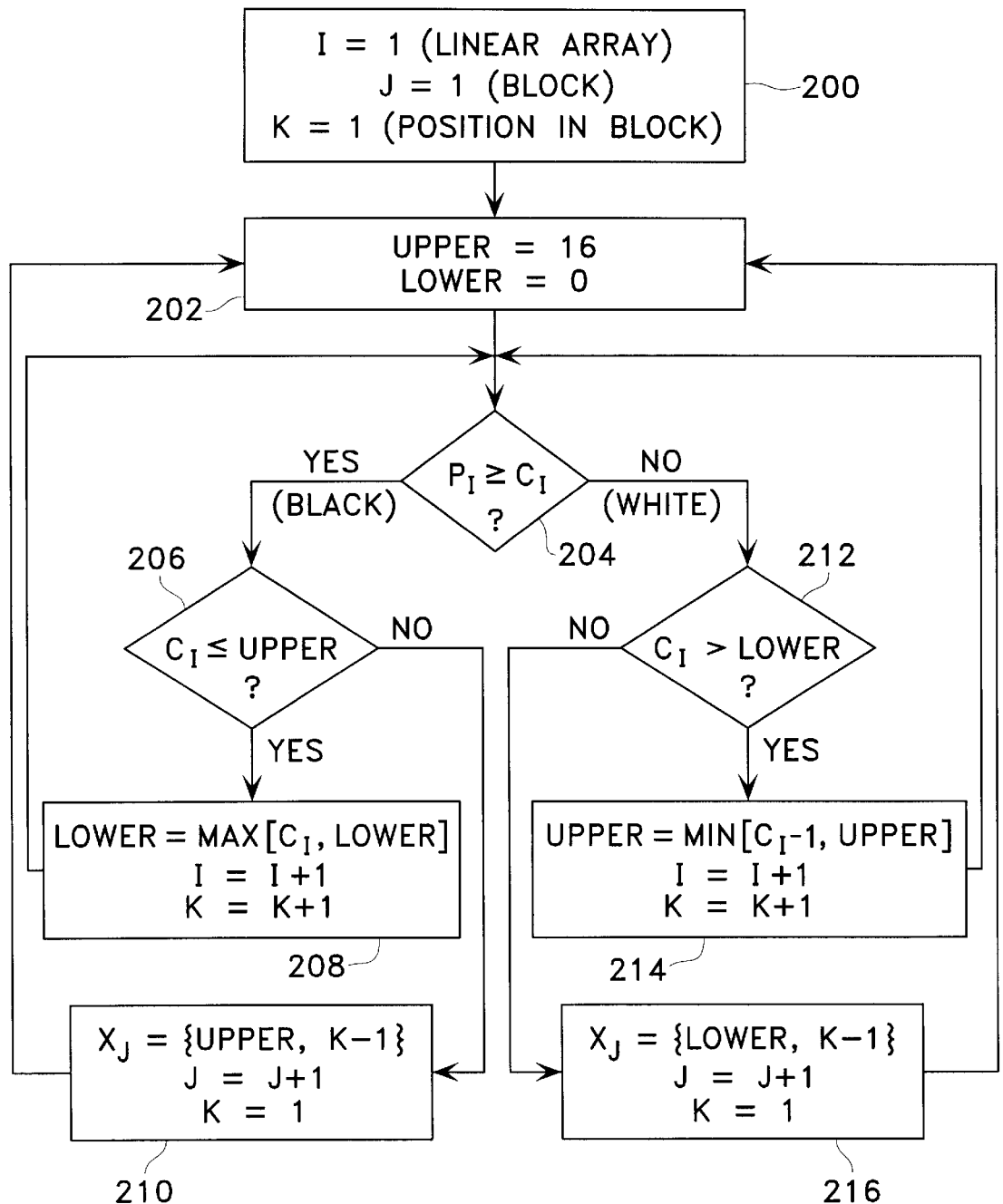
FIG. 8 is a flow chart of a preferred embodiment.

A presently preferred solution is illustrated in FIG. 7. The two dimensional pixel array (for example, the bi-level 4×4 pixel image of FIG. 5) is converted into a linear array, for example by scanning each row from left to right, or preferably, as indicated by the arrows of FIG. 7, by scanning each row in alternating directions. Each successive pixel in the linear array is compared to the corresponding cell in the dither matrix (for example, the dither matrix of FIG. 3), and the intensities of as many successive pixels as possible are set to a common value such that when dithered again by the dither matrix, the corresponding portion of the bi-level image is identical to the result of using that dither matrix to process the corresponding portion of the original grey scale image. Thus, a first block consisting of the first 3 pixels of the first row has an intensity of 10 (or any other arbitrary intensity between 10 and 15), a second block consisting of the last pixel of the first row, all the pixels of the second row, and the first three pixels of the third row has an arbitrary intensity between 5 and 6 (for example, 5), and a third block consisting of the last pixel of the third row and all pixels of the fourth row has an arbitrary intensity between 9 and 11 (for example, 9). More particularly, as shown in the Flow chart of FIG. 8, if the intensity of a pixel $P_I$ is greater than the value of the corresponding cell $C_I$ of the dither matrix ("Yes" branch from block 204), the corresponding pixel of the dithered image is black, and may be represented by a pixel having an intensity greater than the threshold value of that cell, which establishes a lower limit LOWER for the possible intensity of that block; similarly, a white pixel in the dithered image of that same block ("No" branch from block 204), establishes an upper block intensity limit UPPER. If the next pixel in the block has a black dithered image and the corresponding threshold $C_I$ is less than or equal to any previously established maximum intensity UPPER (block 206), the previous minimum intensity LOWER is replaced by the greater of the old minimum intensity LOWER or the corresponding threshold value C-I, (block 208). Similarly, if the next pixel in the block has a white dithered image and the corresponding threshold $C_I$ is greater than any previously established minimum intensity LOWER (block 212), the previous maximum intensity UPPER is replaced by the lesser of the old maximum intensity UPPER or the corresponding threshold value C-I (block 214). The process is repeated for successive pixels, until a pixel is located which would otherwise cause the most recent value of the lower block intensity limit LOWER to exceed the most recent value of the upper block intensity limit UPPER ("No" branches from blocks 206, 212), whereupon that pixel becomes the first pixel in a new block (blocks 210, 216) and the two limits UPPER and LOWER are reset to their starting values (block 202). Each block of pixels X, may thus be represented by a single intensity value (blocks 210, 216) between the most recent LOWER and UPPER limits established for that block and by the number of pixels (K−1) in that block. Because the size and intensity of each block was preferably determined such that it corresponds exactly to the corresponding block of the dithered image after processing with the dither matrix, the result is a lossless compression scheme for the dithered image. Moreover, because the compressed image is a lower resolution version of the original image but is essentially free of the "blue noise" introduced by the dithering process, it is inherently more compressible than either the original image or the dithered image. When applied to the grey-scale image of FIG. 1, the result is a compressed image which after processing by the same dithering matrix as is used to encode the image data, is indistinguishable from the dithered version of the original uncompressed image, but which occupies only 15 kilobytes. Although the effective compression factor is not as low as is possible using the aforementioned lossy compression scheme with a fixed reduction in image resolution, using the dither matrix to decompose the original image into variable sized blocks which are equivalent to corresponding sized blocks in the dithered image results in a significant improvement over either dithering after conventional JPEG compression (24 kilobytes) or dithering without prior compression (52 kilobytes) or dithering without prior compression but with subsequent lossless arithmetic encoding (45 kilobytes). If some loss can be tolerated, then the lower resolution image encoded with the dither matrix could possibly be further compressed with a lossy compression algorithm such as JPEG.

As shown in FIG. 9, the linear path may extend through a block of unlimited size constructed in hierarchial fashion from several adjacent smaller areas.

Those skilled in the art will recognize that the best compression is achieved when the path does not frequently cross high contrast boundaries within the image, and that therefore it is preferable that the path completely cover a relatively compact area before traversing an adjacent area; however, the invention is also believed to provide useful compression when scanning the image in a simple raster fashion, or when the linear path is confined within a portion of the image corresponding to single copy of the dither matrix.

The foregoing assumes that the encoded image is represented by series of two dimensional vectors each comprising a constant intensity and a run length, with the quantization of the intensity in the encoded image (for example, 4 bits or 16 levels) being identical to that in the original image. However, the algorithm can be readily generalized to other cases where the intensity in the encoded image is more than two levels, but less than the number of intensity levels in the original image (if only two levels were provided for, the encoded image would already be a bi-level image would thus be indistinguishable from the dithered image).

Another variation is obtained by using an adaptive compression technique such as Ziv to supplement or replace some of the waveforms corresponding to different intensity levels in each block of the compressed image with one or more non-constant waveforms (sequence of intensities) to increase the run length of the average block, resulting in a more efficient algorithm that may still use the dither matrix to match the longest possible sequences of pixels to a limited number of waveforms.

Under either alternative, as long as the waveforms include constant black and constant white, an exact match between a single pixel of the dithered original image (which will typically will be a bi-level image) and the corresponding pixel of the dithered encoded image will always be possible, and the compression will be lossless, with average run length and thus the effective compression ratio varying as a function of the complexity of the dithered image and how many intensity levels and/or waveforms are available to encode the image.

The present invention may also be extended to a least squares data-fitting approach using a larger set of waveforms but with a constant run length in which the dithered image is approximated by a sequence of polynomials of order n (each corresponding to a different intensity waveform in the original image), encoded by conventional compression means such as Lempel Ziv.

What is claimed is:

1. A method of printing a digitized original image having a plurality of pixels and multiple intensity levels, comprising the steps of:

providing a dither matrix having a plurality of pixel positions and a respective threshold value for each pixel position within the matrix;

generating a lower resolution, multiple intensity version of the original image by;

using the dither matrix to perform a dithering transformation on each pixel of the original image into a respective pixel of a first dithered image having a lower resolution than the original image with the same number of said pixels as the original image but fewer of said intensity levels, and with some added noise, and using the same dither matrix to perform an undithering transformation on each pixel of the first dithered image into a respective pixel of a lower resolution undithered multiple intensity image free of at least some of the noise that was introduced by the dithering transformation;

compressing the lower resolution multiple intensity image to thereby establish an encoded image;

uncompressing the encoded image to thereby establish a decoded image having said multiple intensity levels;

using the same dither matrix to perform the same said dithering transformation on each pixel of the decoded image to thereby establish a second dithered image, and printing the second dithered image.

2. The method of claim 1, wherein:

the encoded image is stored before it is subsequently decoded.

3. The method of claim 1, wherein:

the encoded image is transmitted before it is subsequently decoded.

4. The method of claim 1, wherein:

the generating step includes the step of replacing a block of contiguous pixels of the original image having different intensities with a corresponding block of contiguous pixels all having a common intensity.

5. The method of claim 4, wherein: the common intensity is selected such that any differences between the first dithered image and the second dithered image are minimized.

6. The method of claim 5, wherein:

the encoded digitized image is further compressed by a known compression algorithm.

7. The method of claim 4, wherein:

each group of contiguous pixels is a block having a predetermined size.

8. The method of claim 4, wherein:

the blocks of contiguous pixels have varying sizes.

9. The method of claim 8, wherein:

the blocks of contiguous pixels are successive disjoint portions of a predetermined path traversing all of the pixels of the original image in a predetermined 2-dimensional array.

10. The method of claim 9, wherein:

the sizes of the disjoint portions are selected such that there are no differences between the first dithered image and the second dithered image.

11. A method of manipulating a high resolution matrix image of a plurality of multiple intensity level pixels to facilitate printing the high resolution matrix image, comprising:

performing a dithering transformation on each individual pixel in the high resolution image using a dither matrix to establish a noise added dithered image of a like number of pixels of at least two different intensity levels, said dither matrix corresponding in size to a portion of the high resolution matrix image, and having a plurality of cells, each cell representing a threshold value to facilitate said dithering transformation on the individual ones of the pixels in the high resolution image;

performing an undithering transformation on each individual pixel in the noise added dithered image using said dither matrix to establish a lower resolution multi-intensity level image substantially free of noise;

compressing said lower resolution image to provide an encoded image for image storage and transmission purposes;

uncompressing subsequently said encoded image to provide another lower resolution multi-intensity level image substantially free of noise; and performing a dithering transformation on each individual pixel in said another lower resolution image to provide a resulting uncompressed dithered image that is substantially similar to the first mentioned dithered image that resulted from said step of performing a dither transformation on each individual pixel in the high resolution image.

12. A method according to claim 11, wherein said dither matrix is a predetermined dither matrix.

13. A method according to claim 11, wherein the threshold values correspond to pixel intensity level values.

14. A method according to claim 13, wherein the threshold values are distributed in a pseudo-random pattern.

15. A method according to claim 11, further comprising:

printing said resulting uncompressed dithered image.

* * * * *